United States Patent
Van Veen et al.

(10) Patent No.: US 8,304,739 B2
(45) Date of Patent: Nov. 6, 2012

(54) DIRECT CONVERSION DETECTOR

(75) Inventors: Nicolaas Johannes Anthonius Van Veen, Geldrop (NL); Rob Van Asselt, Valkenswaard (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 168 days.

(21) Appl. No.: 12/746,390

(22) PCT Filed: Dec. 12, 2008

(86) PCT No.: PCT/IB2008/055266
§ 371 (c)(1),
(2), (4) Date: Jun. 4, 2010

(87) PCT Pub. No.: WO2009/083849
PCT Pub. Date: Jul. 9, 2009

(65) Prior Publication Data
US 2010/0243906 A1 Sep. 30, 2010

Related U.S. Application Data

(60) Provisional application No. 61/015,208, filed on Dec. 20, 2007.

(51) Int. Cl.
*G01T 1/24* (2006.01)
*G01T 1/161* (2006.01)
(52) U.S. Cl. ............................... 250/370.08; 250/370.13
(58) Field of Classification Search ............... 250/370.08
See application file for complete search history.

(56) References Cited

U.S. PATENT DOCUMENTS

| | | | |
|---|---|---|---|
| 5,611,481 A | 3/1997 | Akamatsu et al. | |
| 5,641,996 A | 6/1997 | Omoya et al. | |
| 5,723,866 A * | 3/1998 | Hamilton, Jr. | 250/370.09 |
| 5,786,597 A * | 7/1998 | Lingren et al. | 250/370.09 |
| 5,952,646 A | 9/1999 | Spartiotis et al. | |
| 6,933,505 B2 | 8/2005 | Vuorela | |
| 7,041,981 B2 | 5/2006 | Kuroda et al. | |
| 7,223,981 B1 | 5/2007 | Capote et al. | |
| 2003/0173522 A1* | 9/2003 | Spartiotis | 250/370.09 |
| 2003/0215056 A1* | 11/2003 | Vuorela | 378/62 |
| 2004/0046123 A1* | 3/2004 | Dausch | 250/351 |
| 2004/0096031 A1* | 5/2004 | Caria et al. | 378/62 |
| 2007/0224722 A1 | 9/2007 | Matthews et al. | |

FOREIGN PATENT DOCUMENTS
GB 2319394 A 5/1998

OTHER PUBLICATIONS

Park, S. H., et al.; Influence of Surface Treatment of CdZnTe for the Radiation Detector; 2005; IEEE Trans. on Nuclear Science; vol. 3; pp. 1399-1401.

* cited by examiner

*Primary Examiner* — Marcus Taningco

(57) ABSTRACT

A radiation-sensitive detector includes a first substrate 202 with first and second opposing sides. The first side detects incident radiation, and the first substrate 202 produces a signal indicative of the detected radiation. At least one electrical contact 204 is located on the first substrate 202. An electrically conductive material 214 is coupled to the at least one electrical contact 204. The electrically conductive material 214 has a melting point in a range of about seventy-two (72) degrees Celsius to about ninety-five (95) degrees Celsius.

22 Claims, 3 Drawing Sheets

DIRECT CONVERSION DETECTOR

CROSS REFERENCE TO RELATED APPLICATIONS

This application claims the benefit of U.S. provisional application Ser. No. 61/015,208 filed Dec. 20, 2007, which is incorporated herein by reference.

The present application generally relates to radiation-sensitive detectors. While it is described with particular application to a single photon emission computer tomography (SPECT) system, it also relates to other applications in which it is desirable to detect radiation and generate a signal indicative thereof, including CT and static X-ray detectors.

A medical imaging system may include an array of indirect conversion (scintillator/photosensor) detectors such as a gadolinium oxysulfide (GOS) detectors or direct conversation detectors such as Cadmium Zinc Telluride (CZT) detectors. Direct conversion detectors directly convert detected radiation to electrical signals such as an electrical current.

An example direct conversion detector includes a CZT radiation sensitive semiconductor substrate with a first side that receives radiation and a second opposing side with electrical contacts for transferring corresponding electrical signal. The radiation sensitive semiconductor substrate may be partitioned into a plurality of rows of detector elements and a plurality of columns of detector elements to form a two dimensional array of detector elements. Each detector element is associated with a corresponding electrical contact for transferring the corresponding electrical signal to a readout substrate, which in turn includes electrical contacts for transferring the electrical signal off of the detector.

With CZT based detectors, the electrical contacts on the CZT radiation sensitive semiconductor substrate may be gold (Au), platinum (Pt) or Indium (In), depending on the manufacturer of the detector and/or other factors. However, Au and Pt have poor adhesion properties on CZT. A conductive adhesive can be used to improve adhesion between Au or Pt and CZT. In has better adhesion properties with CZT, relative to Au and Pt; however, In can be difficult to contact. As a result, it may be difficult to form interconnects on an In based electrical contact. However, a conductive adhesive can be used with In to improve the contact properties of In.

Unfortunately, In oxidizes and conductive adhesives used with In are sensitive to humidity and may swell. As such, the electrical contacts may degrade over time, physically and mechanically. Such degradation may result in a degraded electrical connection and electrical current flow and/or severing of the electrical contact from the CZT substrate. As a result, the reliability of CZT detectors constructed with In and a conductive adhesive may be less than desired for some applications, and the performance of the detector may fall out of a specified operational range over time.

Aspects of the present application address the above-referenced matters and others.

According to one aspect, a radiation-sensitive detector includes a first substrate with first and second opposing sides. The first side detects incident radiation, and the first substrate produces a signal indicative of the detected radiation. At least one electrical contact is located on the first substrate. An electrically conductive material is coupled to the at least one electrical contact. The electrically conductive material has a melting point in a range of about seventy-two degrees Celsius to about ninety-five degrees Celsius.

In another aspect, a medical imaging system includes a radiation sensitive detector array that detects radiation traversing an examination region and produces an electrical signal indicative of the detected radiation. The radiation-sensitive detector array includes a radiation sensitive substrate, an electrical contact coupled to the radiation sensitive substrate, and an electrically conductive material coupled to the at least one electrical contact. The electrically conductive material is a low temperature solder.

In another aspect, a method includes reflowing a low temperature InBi based solder to a first electrical contact on a read out substrate, and reflowing the low temperature InBi based solder to an In based electrical contact on a CZT based radiation sensitive substrate.

Still further aspects of the present invention will be appreciated to those of ordinary skill in the art upon reading and understand the following detailed description.

The invention may take form in various components and arrangements of components, and in various steps and arrangements of steps. The drawings are only for purposes of illustrating the preferred embodiments and are not to be construed as limiting the invention.

Figure 1:
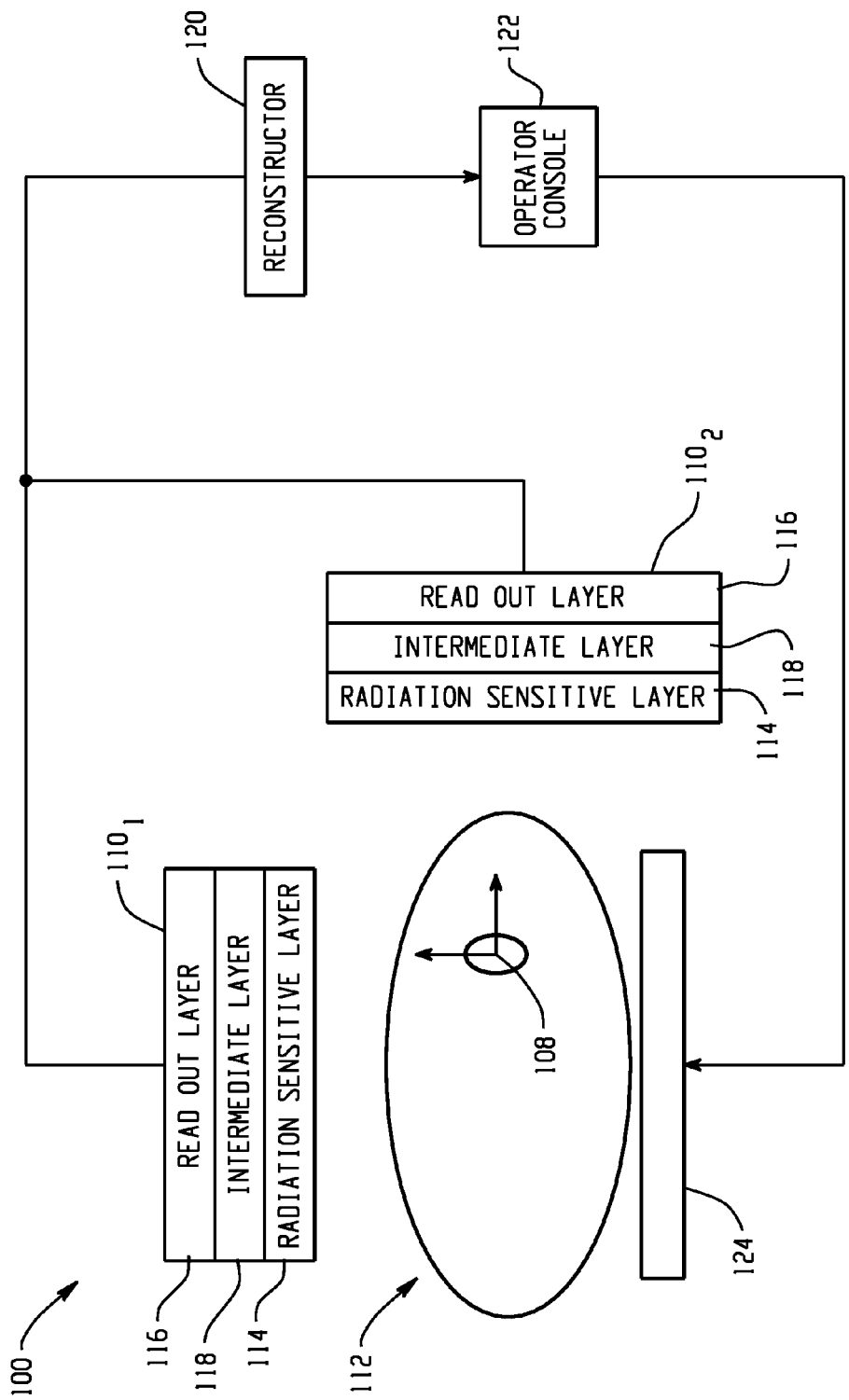
FIG. 1 illustrates an exemplary medical imaging system.

With reference to FIG. 1, a SPECT system 100 includes at least one radiation sensitive detector array 110. As depicted, the illustrated system 100 includes two radiation sensitive detector arrays $110_1$ and $110_2$. The radiation sensitive detector arrays $110_1$ and $110_2$ are disposed relative to each other at an angle in the range of roughly ninety (90) degrees to one hundred and two (102) degrees. Other numbers of detector arrays 110 and angles therebetween are contemplated. The radiation sensitive detector arrays $110_1$ and $110_2$ rotate about an examination region 112 and acquire projections for plurality of projection angles or views.

In the illustrated example, the radiation sensitive detector arrays $110_1$ and $110_2$ are two-dimensional direct conversion detector arrays that include various layers. Such layers may include a radiation sensitive layer 114, a read out layer 116, and an intermediate layer 118. The intermediate layer 118 electrically and physically couples the radiation sensitive layer 114 and the read out layer 116.

As described in greater detail below, the radiation sensitive layer 114 may include a Cadmium Zinc Telluride (CZT) substrate with at least one electrical contact formed from a material that adheres well to CZT. In addition, the intermediate layer 118 may include a material that is well suited to form an electrical interconnect with the electrical contact on the CZT substrate.

In general, the radiation sensitive layer 114 receives gamma radiation from radionuclide decay 108 occurring in the examination region 112 and generates a signal indicative thereof. The signal is conveyed through the intermediate layer 118 to the read out layer 116. The signal is output from the detector 110 via the read out layer 116.

A reconstructor 120 reconstructs the projections to generate volumetric image data representative of the detected gamma radiation. The volumetric image data is indicative of the examination region 112.

A computer serves as an operator console 122. The console 122 includes a human readable output device such as a monitor or display and an input device such as a keyboard and mouse. Software resident on the console allows the operator to control and interact with the scanner 100, for example, through a graphical user interface (GUI).

An object support 124 such as a couch supports a patient or other object in the examination region 112. The object support 124 is movable so as to guide the object within respect to the examination region 112 while performing a scanning procedure. This may include longitudinally moving the object support 124 in coordination with operation of the gamma radiation sensitive detectors 110 so that an object can be scanned at a plurality of longitudinal locations according to desired scanning trajectories.

Figure 2:
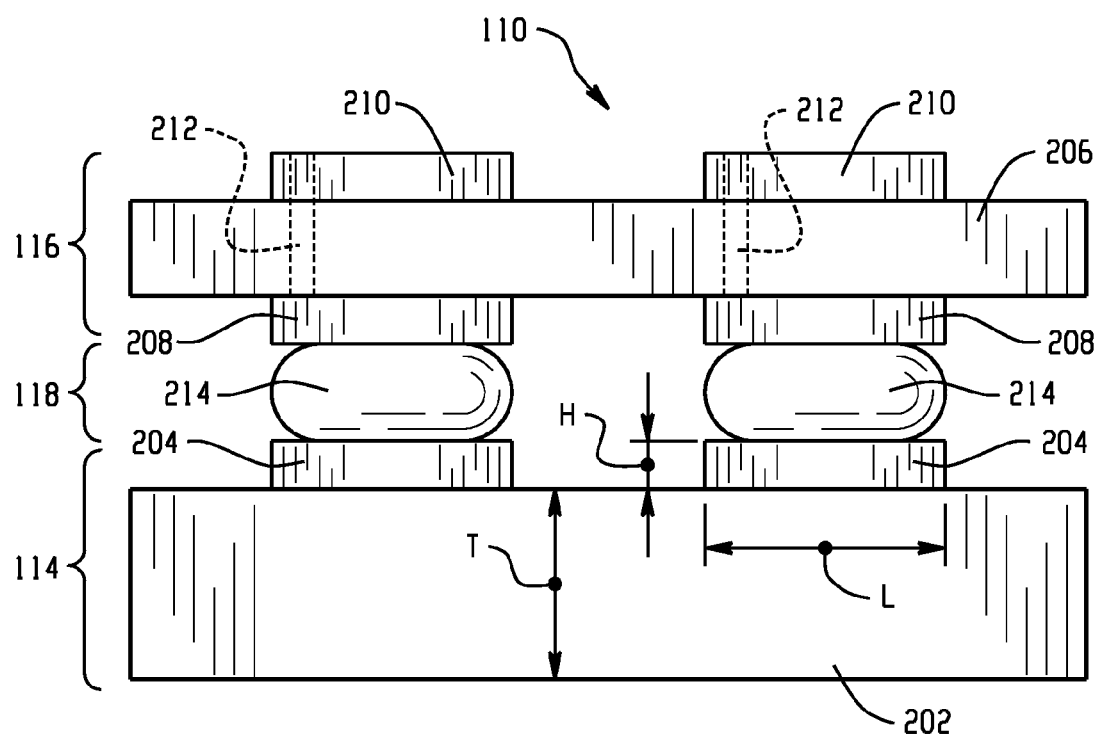
FIG. 2 illustrates an example radiation sensitive detector array.

FIG. 2 depicts a sub-portion of an example detector array 110. It is to be understood that the size, shape and/or number of the various illustrated components of the detector array 110 are shown for explanatory purposes; the size, shape and/or number of the various components are not to be construed as limiting.

As shown, the radiation sensitive layer 114 includes a radiation sensitive substrate 202. In this example, the radiation sensitive substrate 202 includes a high density, semi-conducting material. An example of such a material is Cadmium Zinc Telluride (CdZnTe or CZT). Using CZT, the radiation sensitive substrate 202 can be used to directly convert received radiation into an electrical signal such as an electrical current.

A thickness "T" of the radiation sensitive substrate 202 may define the absorption characteristics of the detector array 110 and is often configured for an application in which the detector array 110 is used. For example, for an application in which a relatively higher energy (e.g., greater than one hundred (100) keV) photon is detected, the radiation sensitive substrate 202 may be about three to five (3-5) millimeters thick, and for an application in which a relatively lower energy (e.g., less than forty (40) keV) photon is detected, the radiation sensitive substrate 202 may be about one (1) millimeter or less thick.

Affixed to the radiation sensitive substrate 202 are electrical contacts 204 such as bonding pads. As noted above, the electrical contacts 204 include a material with relatively good adhesion properties to CZT. One such material is Indium (In). In has a melting point of about one hundred and fifty-five (155) degrees Celsius, which also is a suitable temperature for CZT. Other materials are also contemplated herein.

Similar to the radiation sensitive layer 114, the dimensions of the electrical contacts 204 are configured for the application in which the detector array is used. For example, in one non-limiting instance a height "H" of the electrical contacts 204 may be in a range from about one hundred (100) nanometers (nm) to about one half (0.5) a micron. In addition, a length "L" of the electrical contact 204 may be in a range from about two hundred and fifty (250) microns to about two (2) millimeters (mm).

By way of example, for a pitch of about three hundred (300) microns, the length of each of the electrical contacts 204 may be about two hundred and fifty (250) microns, with a spacing between the electrical contacts 204 being about fifty (50) microns. For a pitch of about two and a half (2.5) mm, the length of each of the electrical contacts 204 may be about one and eight tenths (1.8) mm, with a spacing between the electrical contacts 204 being about seven tenths (0.7) of a millimeter.

The electrical contacts 208 may be affixed to the substrate 206 by the manufacturer of the substrate 206, for example, through a suitable mask, lithography, etc., or otherwise.

The readout layer 116 includes a substrate 206, which may be a printed circuit board (PCB) or the like. Affixed to the substrate 206 on a first side, which faces the substrate 202, are first electrical contacts 208 such as bonding pads. The first electrical contacts 208 are formed from a material wettable by solder. Such a material may be metallic. Examples include, but are not limited to, copper (Cu), gold (Au), silver (Ag) or the like.

Affixed to the substrate 206 on a second opposing side, which faces away from the substrate 202, are second electrical contacts 210. The second electrical contacts 210 may be formed from copper (Cu), gold (Au), silver (Ag) or the like.

At least one via 212 extends from each of the second electrical contacts 210, through the substrate 206, to a corresponding one of the first electrical contacts 208, thereby providing an electrical path between the first and second electrical contacts 208 and 210. The electrical signal produced by the radiation sensitive layer 114 can be transferred from the detector array 110 through the first electrical contacts 208.

In the example shown in FIG. 2, the pitch of the electrical contacts (208 and 210) on both sides of the substrate (206) is equal. However, in other embodiments the pitch may be different. In one instance, the ASIC is attached to the second side, facing away from the substrate 202, for the processing of the electrical signals generated in the direct conversion material. The footprint of the ASIC is typically different from that of the direct conversion material, and in that case the substrate 206 is more complex (e.g. multi-layer) and also serves as a re-routing layer between different pitches of the electrical contacts on both sides.

As noted above, the intermediate layer 118 electrically couples the radiation sensitive layer 114 and the readout layer 116. In one instance, the intermediate layer 118 includes a solder 214 that generally wets well to the electrical contacts 204 on the substrate 202. For example, where the electrical contacts 204 include In, a suitable solder includes In, an In alloy and/or another material(s) with properties, such as a melting point that is not greater than the melting point of the In electrical contacts 204, good adhesion to In, wets well with In, and/or other properties.

In the illustrated example, the solder 214 that includes at least In and Bismuth (Bi). For example, the illustrated solder 214 is a solder that is near eutectic InBi, about sixty-six percent (66%) In and about thirty-four (34%) Bi by weight. Such a solder has a melting point at which In and Bi transition to a liquid state at substantially the same time. In one instance, the melting point of the near eutectic InBi solder is in a range of about seventy-two (72) to ninety-five (95) degrees Celsius, for example, about seventy-two (72) degrees Celsius. In another example, the solder 214 includes twenty-five to seventy percent (25-70%) In and thirty to sixty percent (30-60%) Bi by weight. Other percentages are also contemplated.

In has a melting point of about one hundred and fifty-six and six tenths (156.6) degrees Celsius. As a result, the solder 214 melts without melting the In electrical contact 204. It is noted that conventional tin (Sn) based solders may have melting points around one hundred eighty (180) degrees Celsius to around one hundred ninety (190) degrees Celsius. Relative to such Sn based solders, the solder 214 may be referred to as a low temperature solder, for example, when the solder 214 has a melting point of about seventy-two (72) degrees Celsius.

Alternative eutectic solders, which fulfill the abovementioned requirements, include, but are not limited to, $Bi_{48.5}In_{41.5}Cd_{10}$ with a eutectic point of seventy-seven and five tenths (77.5) degrees Celsius, $Bi_{57}In_{26}Sn_{17}$ with a eutectic point of seventy-nine (79) degrees Celsius, $Bi_{54}In_{29.7}Sn_{16.3}$ with a eutectic point of eighty-one (81) degrees Celsius and $Cd_{14}In_{44}Sn_{42}$ with a eutectic point of ninety-three (93) degrees Celsius.

In addition, such a solder wets well the In based electrical contacts 204. Such a solder may also be ductile, which may reduce degradation of the detector array 110 if the detector array 110 is exposed to temperature in a temperature range from around minus forty (−40) degrees Celsius to around seventy (70) degrees Celsius. A harder solder may become unreliable and brittle, for example, at low temperatures. Alternatively, less ductile materials will induce stresses in the direct conversion materials upon temperature variations, which ultimately can lead to failures.

Figure 3:
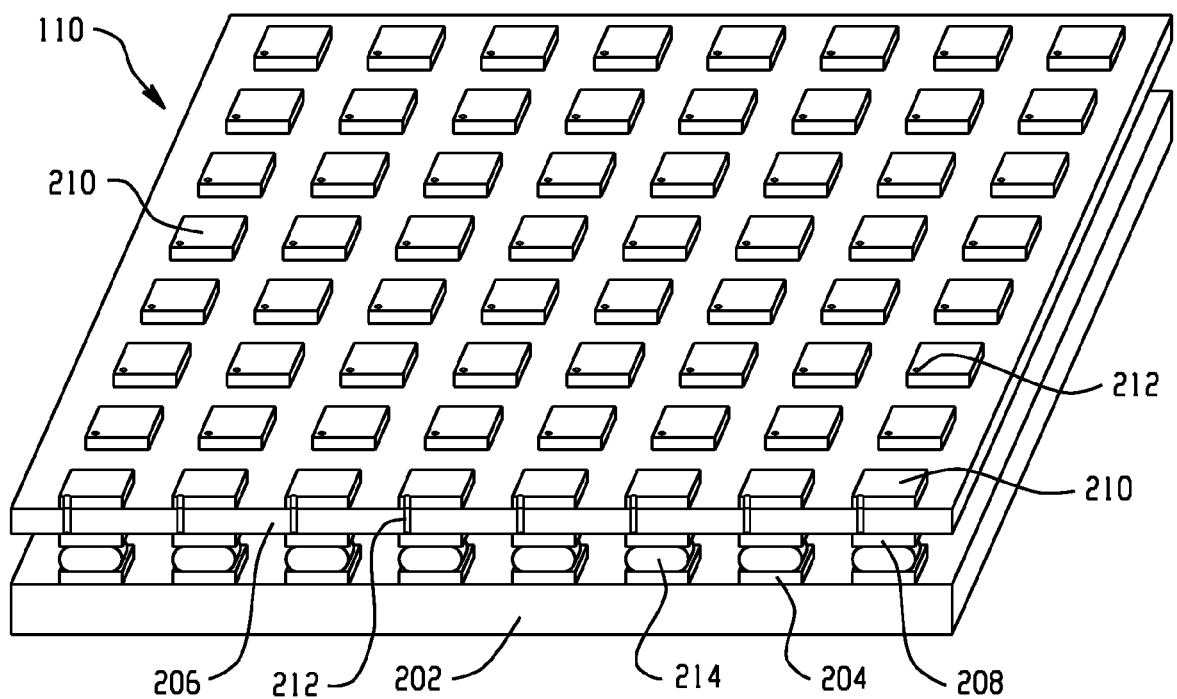
FIG. 3 illustrate an example radiation sensitive detector array.

FIG. 3 illustrates a sub-portion of non-limiting detector array 110. Shown are the CZT radiation detector substrate 202, the electrical contacts 204, the InBi solder interconnects 214, the readout substrate 206, the second electrical contacts 210, and the via's 212. In this example, the detector array 110 includes a plurality of rows and a plurality of columns of detector elements to form a two-dimensional detector array 110. It is to be appreciated that the detector array 110 may be tiled with one or more other detector arrays 110 to increase the detection surface of the detector array 110.

Figure 4:
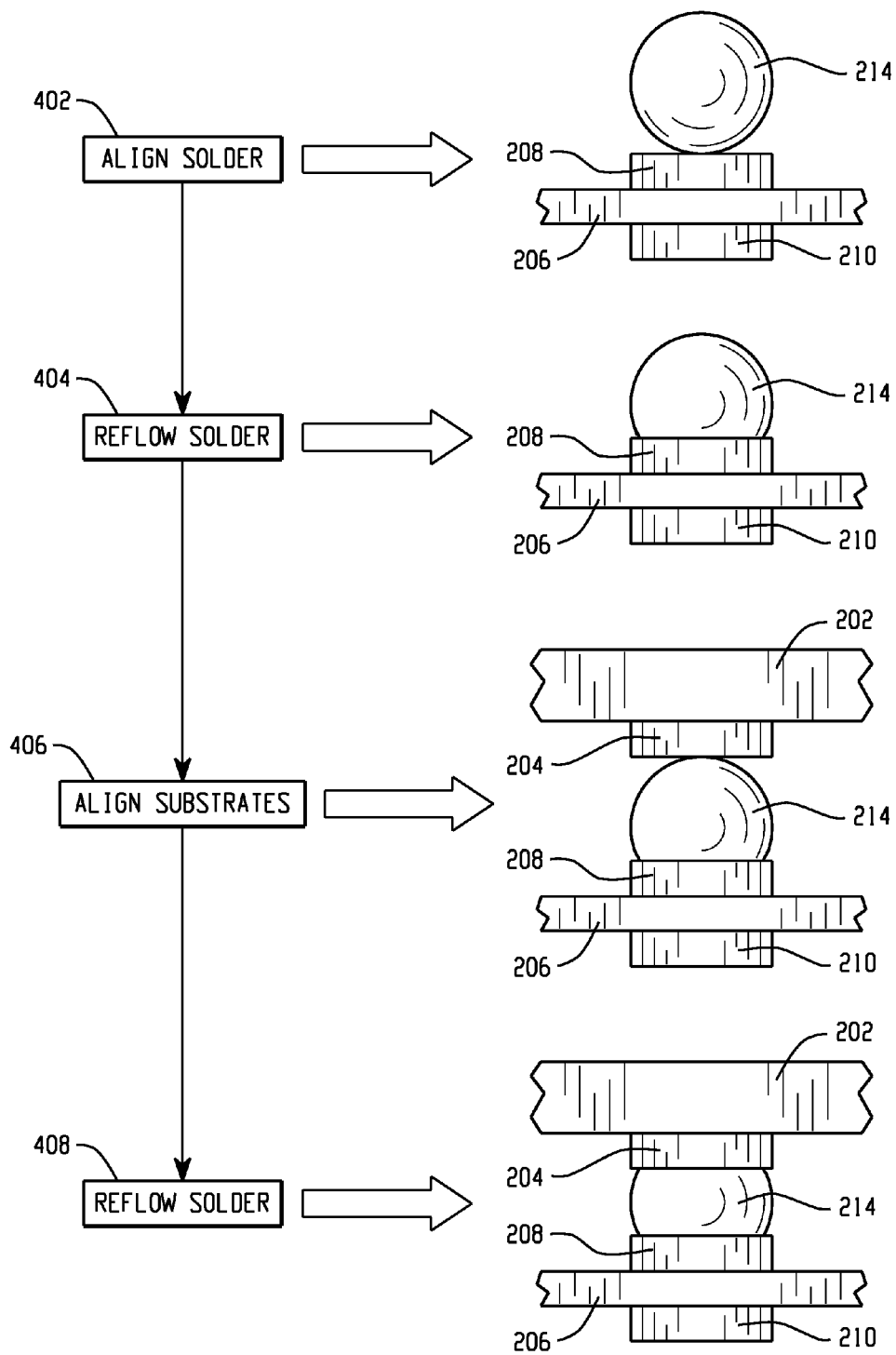
FIG. 4 illustrates a method.

FIG. 4 illustrates a non-limiting method for forming the detector array 110. At 402, the solder 214 is aligned on the first electrical contact 208 of the read out substrate 206. As noted above, in one instance the solder 214 is near eutectic InBi, with a melting point of about seventy-two (72) degrees Celsius, and the electrical contact 208 is a bond pad that includes a metallic material such as Cu, Ag, Au, or the like. The electrical contacts 208 may be tinned and/or otherwise prepared prior to aligning the solder 214 on the electrical contact 208.

At 404, the solder 214 is reflowed onto the electrical contacts 208. A reducing agent such as a rosin based flux may be used to help remove impurities such as oxidized metals from the points of contact with the electrical contact 208 to improve the electrical connection. The read out substrate 206 may be cleaned afterwards with solvents and/or deionized water to remove any extraneous residue from the substrate 206.

At 406, the read out substrate 206 is aligned with CZT radiation sensitive substrate 202 such that the solder 214 on the electrical contact 208 aligns with the electrical contact 204 on the CZT radiation sensitive substrate 202. As noted above, the electrical contacts 204 may include In, an In alloy or other material that suitably adheres to the CZT substrate 204 and that is suitably wetted by the InBi solder 214. Again, rosin or other flux may be used to activate the surface.

At 408, the solder 214 is reflowed onto the electrical contact 204 of the substrate 202. The reflow temperature can be kept within a range of about seventy-two (72) degrees Celsius to about one hundred (100) degrees Celsius. For example, the reflow temperature may be kept in a range of about ninety (90) degrees Celsius to about ninety-five (95) degrees Celsius. In one instance, this temperature range may ensure suitable melting and flow of the solder 214.

Reverse order processing, starting by application of solder on the direct conversion material, may also be used.

A vapor phase reflow technique may be used to reflow the solder 214. For instance, a vapor from a boiling fluid such as an organic solvent or the like, with a suitable boiling point, may be used to reflow the solder 214. With such a technique, the solvent is boiled, and the resulting vapor condenses and deposits condensation energy used to reflow the solder 214. In addition, no overheating occurs. An example of such a fluid includes Fluorinert liquid FC-77, which is a liquid used in heat transfer applications and is provided by 3M of St. Paul, Minn., USA. Other fluids are also contemplated. Such fluids may have one or more of the properties from Table 1.

TABLE 1

Example Vapor Phase Soldering Fluid Properties.

| Properties | |
|---|---|
| Appearance | Clear, colorless |
| Average Molecular Weight | 416 |
| Boiling Point (1 atm) | 97° C. |
| Pour Point | −110° C. |
| Calculated Critical Temperature | 495 K |
| Calculated Critical Pressure | $1.58 \times 10^6$ Pascal |
| Vapor Pressure | $5.62 \times 10^3$ Pascal |
| Latent Heat of Vaporization (at normal boiling point) | 89 J/g |
| Liquid Density | 1780 kg/m$^3$ |
| Kinematic Viscosity | 0.72 centistokes |
| Absolute Viscosity | 1.3 centipoise |
| Liquid Specific Heat | 1100 J kg$^{-1}$° C.$^{-1}$ |
| Liquid Thermal Conductivity | 0.063 W m$^{-1}$° C.$^{-1}$ |
| Coefficient of Expansion | 0.00138° C.$^{-1}$ |
| Surface Tension | 13 dynes/cm |
| Refractive Index | 1.28 |
| Water Solubility | 13 ppmw |
| Solubility in Water | <5 ppmw |
| Ozone Depletion Potential | 0 |

Variations are described.

In other embodiments, the detector array 110 includes other direction conversion materials such as Cadmium Telluride (CdTe), Lead(II) oxide (PbO), and the like.

As described above, a rosin based reducing agent may be used to help remove impurities from the electrical contact 208. In another instance, an acid or a water-soluble flux may be alternatively used. In another instance, a "no clean" flux such as one that leaves benign residue after soldering may also be used. In yet another instance, no reducing agent is used.

In the illustrate embodiment, a vapor phase soldering technique is used to reflow the solder 214 on the electrical contact 204 of the substrate 202. In another example, an Infrared (IR), forced convection (FC), waves soldering (WS), inert gas such as Nitrogen (N2), or other reflow technique may be used.

Applications of the forgoing and variations thereof include, but are not limited to, SPECT as well as other medical and non-medical applications such as CT, PET, x-ray, gamma ray, etc. applications using a radiation-sensitive detector to detect radiation.

The invention has been described with reference to the preferred embodiments. Modifications and alterations may occur to others upon reading and understanding the preceding detailed description. It is intended that the invention be constructed as including all such modifications and alterations insofar as they come within the scope of the appended claims or the equivalents thereof.

Having thus described the preferred embodiments, the invention is now claimed to be:

1. A radiation-sensitive detector array, comprising:
   a CZT or CdTe detector substrate with first and second opposing sides, wherein the first side detects incident radiation, and the CZT or CdTe detector substrate produces a signal indicative of the detected radiation;
   at least one In electrical contact on the CZT or CdTe detector substrate; and
   an InBi solder directly coupled to the at least one In electrical contact, wherein the InBi solder has a melting point in a range of about seventy-two Celsius to about ninety-five degrees Celsius.

2. The radiation-sensitive detector array of claim 1, wherein the InBi solder has a melting point of about seventy-two degrees Celsius.

3. The radiation-sensitive detector array of claim 1, wherein the InBi solder includes a low temperature solder.

4. The radiation-sensitive detector array of claim 1, wherein there is no metallization layer between the at least one Indium electrical contact and the Indium/Bismuth solder.

5. The radiation-sensitive detector array of claim 1, wherein the InBi solder includes a substantially eutectic Indium and Bismuth mixture.

6. The radiation-sensitive detector array of claim 1, wherein the InBi solder consists essentially of an alloy of Indium and Bismuth ranging between 25% to 70% of In by weight.

7. The radiation-sensitive detector array of claim 1, wherein the radiation-sensitive detector array is a direct conversion detector array.

8. The radiation-sensitive detector array of claim 1, wherein the radiation-sensitive detector array is part of a single photon emission computed tomography scanner.

9. A medical imaging system, comprising:
  a radiation sensitive detector array that detects radiation traversing an examination region and produces an electrical signal indicative of the detected radiation, wherein the radiation-sensitive detector array includes:
    a radiation sensitive CZT or CdTe detector substrate;
    an In electrical contact coupled to the radiation sensitive CZT or CdTe detector substrate;
    an InBi solder directly coupled to the at least one In electrical contact, wherein the InBi solder is a low temperature solder.

10. The medical imaging system of claim 9, wherein the InBi solder has a melting point of about seventy-two degrees Celsius.

11. The medical imaging system of claim 9, wherein the InBi solder is electrically and physically coupled to the at least one In electrical contact.

12. The medical imaging system of claim 9, wherein there is no layer of material between the at least one Indium electrical contact and the Indium/Bismuth solder.

13. The medical imaging system of claim 9, wherein the InBi solder consists essentially of an alloy of Indium (In) and Bismuth (Bi) ranging between 30% to 60% of Bi by weight.

14. The medical imaging system of claim 9, wherein the radiation-sensitive detector array is part of a direct conversion detector.

15. A method, including:
  reflowing a low temperature InBi based solder to a first electrical contact on a read out substrate; and
  reflowing the low temperature InBi based solder to an In based electrical contact on a CZT based radiation sensitive substrate.

16. The method of claim 15, further including using a vapor phase soldering technique to reflow the low temperature InBi based solder to the In based electrical contact.

17. The method of claim 15, further including reflowing the low temperature InBi based solder to the In based electrical contact under a temperature in a range of about seventy-two degrees Celsius to about ninety-five degrees Celsius.

18. The method of claim 15, wherein the low temperature InBi based solder has a melting point of about seventy-two degrees Celsius.

19. The method of claim 15, wherein the low temperature InBi based solder includes a substantially eutectic In and Bi mixture.

20. The method of claim 15, further comprising:
  reflowing the low temperature InBi based solder directly onto the In based electrical contact.

21. The method of claim 15, wherein the there is no material between the In electrical contact and the InBi solder.

22. The method of claim 15, wherein the there is no metallization between the In electrical contact and the InBi solder.

* * * * *